United States Patent [19]

Eriksson

[11] Patent Number: 5,635,646
[45] Date of Patent: Jun. 3, 1997

[54] METHOD AND DEVICE FOR MEASURING THE NUMBER OF REVOLUTIONS IN TURBO AGGREGATES FOR MOTORS

[75] Inventor: Lennart Eriksson, Köping, Sweden

[73] Assignee: F. Wennström System AB, Riddarhyttan, Sweden

[21] Appl. No.: 492,055

[22] PCT Filed: Jan. 21, 1994

[86] PCT No.: PCT/SE94/00046

§ 371 Date: Jul. 20, 1995

§ 102(e) Date: Jul. 20, 1995

[87] PCT Pub. No.: WO94/17420

PCT Pub. Date: Aug. 4, 1994

[30] Foreign Application Priority Data

Jan. 22, 1993 [SE] Sweden ................. 9300191

[51] Int. Cl.6 ............... G01N 29/04; G01H 1/00; G01H 11/00
[52] U.S. Cl. ................. 73/660; 364/565; 73/488
[58] Field of Search ............... 73/488, 660, 659, 73/658, 506, 518; 324/160, 161, 163, 166, 76.23, 76.24; 364/565, 426.01; 455/296, 306, 340; 377/19, 23; 388/922

[56] References Cited

U.S. PATENT DOCUMENTS

| | | | |
|---|---|---|---|
| 3,815,426 | 6/1974 | Rohner | 73/488 |
| 4,452,079 | 6/1984 | Tiller | 73/488 |
| 4,988,979 | 1/1991 | Sasaki et al. | 340/683 |
| 5,115,671 | 5/1992 | Hicho | 73/660 |
| 5,365,787 | 11/1994 | Hernandez et al. | 73/660 |
| 5,477,730 | 12/1995 | Carter | 73/660 |

*Primary Examiner*—Hezron E. Williams
*Assistant Examiner*—Rose M. Miller
*Attorney, Agent, or Firm*—Walter Ottesen

[57] ABSTRACT

A method measures the rotational speed of an engine turbocharger. A microphone picks up sound generated by the rotation of the turbocharger and a microphone signal containing signal components is supplied. Low-frequency signal components are filtered out from the microphone signal generated by engine operation including noise from valves, fans and gas flows. An electronic bandpass filter is tuned to the remaining signal component having the highest amplitude in the filtered microphone signal and the frequency of the remaining signal component having the highest amplitude is determined. With a knowledge of the turbocharger geometry, the value of the frequency of the remaining signal component having the highest amplitude is converted to the rotational speed of the turbocharger.

5 Claims, 1 Drawing Sheet

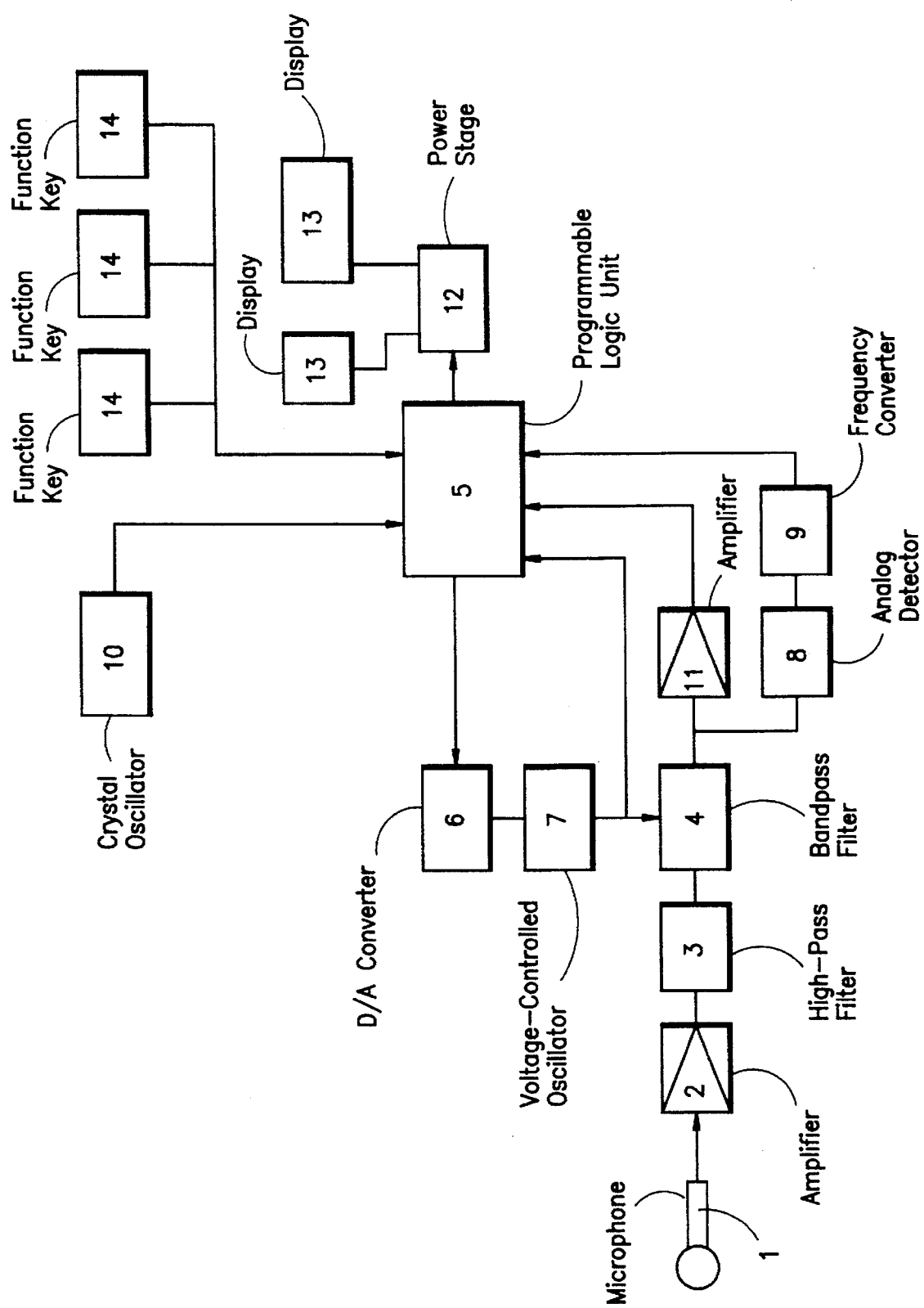

METHOD AND DEVICE FOR MEASURING THE NUMBER OF REVOLUTIONS IN TURBO AGGREGATES FOR MOTORS

BACKGROUND OF THE INVENTION

Engine turbochargers normally operate at extremely high speeds of the order of 120,000 revolutions per minute. To obtain maximum power from the engine, it is essential that the speed of the turbocharger unit be as high as possible; the higher the speed, the greater the quantity of air supplied to the engine. However, the speed is subject to a highly critical threshold which must not be exceeded. If this occurs, bearing life will be drastically reduced by breakup of the lubricating oil film.

In predelivery testing of engines, it is desirable to measure the speed of the turbo at full load and to adjust the value by means of a bypass valve to ensure that the threshold is not exceeded. Since the turbocharger is an integral part of both the engine exhaust and intake systems, access for measurement by conventional methods is difficult.

In the method used until now, a magnetised nut is mounted on the turbo shaft and the speed of the magnetic field generated as the nut rotates is measured. This method is both time-consuming and unreliable since it is difficult to measure the speed of the field with the desired accuracy; the measuring device or probe, which consists essentially of a pickup, cannot be located sufficiently close to the shaft due to the size of the turbo.

SUMMARY OF THE INVENTION

The method of the invention is for measuring the rotational speed of an engine turbocharger. The method includes the steps of: picking up sound generated by rotation of the turbocharger with a microphone and supplying a microphone signal containing signal components; filtering out low-frequency signal components from the microphone signal generated by engine operation including noise from valves, fans and gas flows; tuning an electronic bandpass filter to the remaining signal component having the highest amplitude in the filtered microphone signal; determining the frequency of the remaining signal component having the highest amplitude; and, with a knowledge of the turbocharger geometry, converting the value of the frequency of the remaining signal component having the highest amplitude to the rotational speed of the turbocharger.

The purpose of the present invention is to measure the turbo speed with the aid of a microphone. In tests with a microphone, it has been found that the rotating turbocharger generates a tone whose frequency and amplitude are a function of the speed. The microphone used in the test picks up all sound generated by both the turbo and engine. Low-frequency sound generated by the engine valves, fans, gas flows etc. is removed as far as possible by filtering and the remaining signal contains a turbocharger tone which can be separated by means of a bandpass filter. Since this tone contains too much interference for direct measurement, an electronic tuning fork is instead tuned to the same frequency and that value of frequency is measured. The speed of the turbo may then be determined when the number of turbine blades has been established.

Thus, and according to another feature of the invention, the method can include the following additional steps: tuning an electronic tuning fork to the remaining signal component having the highest amplitude; determining the frequency of the tuning fork; and, with a knowledge of the turbocharger geometry, converting the value of tuning fork frequency to the rotational speed of the turbocharger.

This method of sound measurement enables the speed of the unit to be determined quickly and simply without physical intervention in the turbo.

The method in accordance with the invention also provides a simple means of checking whether the turbo is running at the correct speed in the course of service work. Under normal circumstances, the speed of the unit falls as the turbine driving the compressor becomes fouled, with an adverse effect on engine efficiency. The speed of the turbo can be measured quickly and simply by the proposed method.

BRIEF DESCRIPTION OF THE DRAWING

The single figure of the drawing shows a block circuit diagram of the device according to the invention for measuring the rpm of a turbo aggregate for an engine.

DESCRIPTION OF THE PREFERRED EMBODIMENTS OF THE INVENTION 1 denotes a microphone intended to be placed in the proximity of the turbocharger whose speed is to be measured. It is not necessary that the microphone be located at the unit; it is sufficient that it be located in the same room or space in which the unit is installed.

All of the sound generated by both the turbo and engine is picked up and amplified by means of an amplifier 2 connected to the microphone. A high-pass filter 3 connected to the amplifier 2 is used to filter out all low-frequency sound, such as that generated by the engine valves, fans, gas flows etc., from the signal.

A bandpass filter 4 connected to the high-pass filter 3 is tuned by means of a programmable logic unit 5, a digital/analogue converter 6 and a voltage-controlled oscillator 7 to the remaining signal with the highest amplitude. The amplitude is detected by means of an analogue detector 8 connected to the bandpass filter 4. After detecting the amplitude, the detector 8 employs a frequency converter 9 to convert the output signal to pulses which are counted by the programmable logic unit 5.

To indicate and count the number of blades on the turbine, one to two displays 13 and a power stage 12, as well as function keys 14, are connected to the programmable logic unit 5.

The programmable logic unit 5 can be programmed with an electronic tuning fork if the signal from the bandpass filter 4 contains too much interference or is not of sufficient amplitude.

A crystal oscillator 10, which functions as a time and frequency reference, is also connected to the programmable logic unit 5.

The device of the invention is further explained below with reference to the drawing. The device measures the speed of the turbocharger engine and includes a microphone 1 placed in the proximity of the turbocharger and connected to a first amplifier 2. A highpass filter filters out low-frequency signals from the microphone signal such as sound generated by valves, fans and gas flows as the engine runs. A bandpass filter 4 is connected to the highpass filter 3 and this bandpass filter is tuned to the remaining signal with the highest amplitude by means of a programmable logic unit 5, a digital/analog converter 6 and a voltage-controlled oscillator 7. This amplitude is detected by an analog detector 8 connected to the bandpass filter 4. The detector detects the amplitude and employs a frequency converter 9 to convert the output signal into pulses which are counted by the programmable logic unit 5. Following adjustment of the bandpass filter 4 to the signal with the highest amplitude, a second amplifier 11 matches the signal whose frequency is determined in the programmable logic unit 5. The displays 13 and power stage 12 as well as function keys 14 are provided to indicate and count the number of blades on the turbine. With a knowledge of the turbocharger geometry, the value of frequency of the tone with the highest amplitude is converted to the speed of the turbocharger.

An electronic tuning fork is programmed into the programmable logic unit 5 if the signal from the bandpass filter 4 is of insufficient amplitude or varies excessively.

What is claimed is:

1. A method for measuring the rotational speed of an engine turbocharger, the method comprising the steps of:

picking up sound generated by rotation of the turbocharger with a microphone and supplying a microphone signal containing signal components;

filtering out low-frequency signal components from the microphone signal generated by engine operation including noise from valves, fans and gas flows;

tuning an electronic bandpass filter to the remaining signal component having the highest amplitude in the filtered microphone signal;

determining the frequency of the remaining signal component having the highest amplitude;

with a knowledge of the turbocharger geometry, converting the value of the frequency of the remaining signal component having the highest amplitude to the rotational speed of the turbocharger;

tuning an electronic tuning fork to the remaining signal component having the highest amplitude;

determining the frequency of the tuning fork; and, with a knowledge of the turbocharger geometry, converting the value of tuning fork frequency to the rotational speed of the turbocharger.

2. A device for measuring the rotational speed of an engine turbocharger, the device comprising:

a microphone placed in the proximity of the turbocharger to supply a microphone signal;

a first amplifier connected to said microphone for amplifying said microphone signal;

high-pass filter means for filtering out low-frequency signal components from said microphone signal such as signal components generated by valves, fans and gas flows which are picked up by said microphone as the engine runs;

a bandpass filter connected to a high-pass filter;

tuning circuit means for tuning said bandpass filter to said remaining component having the highest amplitude;

an analog detector connected to said bandpass filter for detecting said amplitude and providing an analog detector output signal;

a frequency converter for converting said output signal into pulses which are fed to said tuning circuit means;

said tuning circuit means including means for counting said pulses;

a second amplifier which, following tuning of said bandpass filter to said remaining component having the highest amplitude, matches said output signal whose pulses are counted in said tuning circuit means; and, means for indicating and counting the number of blades on the turbine and determining the rotational speed utilizing knowledge of the geometry of the turbocharger.

3. The device of claim 2, said tuning circuit means comprising a programmable logic unit, a digital/analog converter and a voltage controlled oscillator; and, said programmable logic unit including means for counting said pulses.

4. The device of claim 3, said means for indicating and counting the number of blades on the turbine being connected to said programable logic unit and comprising: at least one display; a power stage connected between said programmable logic unit and said display; and, a plurality of function keys.

5. The device of claim 4, further comprising an electronic tuning fork, which is programmed into said programable logic unit if the signal from said bandpass filter is of insufficient amplitude or varies excessively.

* * * * *